R. L. CHANCE.
LOCK NUT.
APPLICATION FILED MAR. 31, 1919.
1,377,397. Patented May 10, 1921.
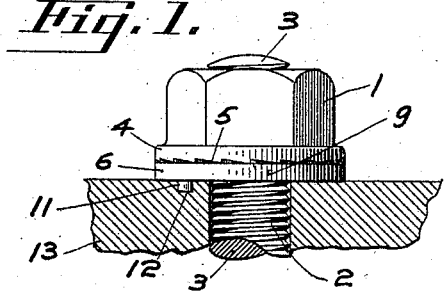
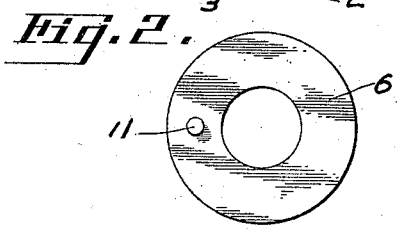
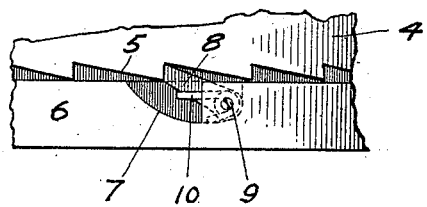
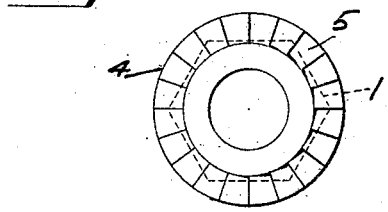
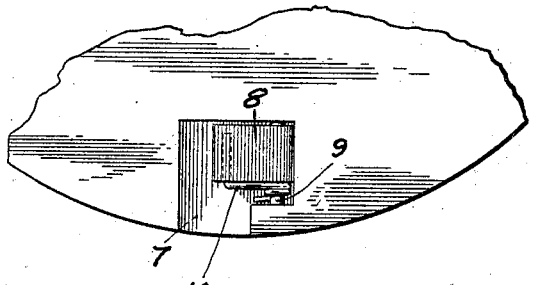
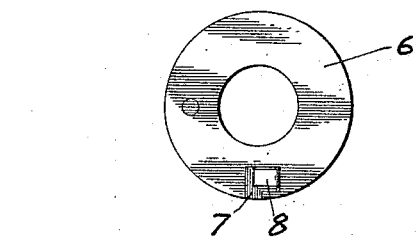
Inventor
Roy L Chance

UNITED STATES PATENT OFFICE.

ROY L. CHANCE, OF SAN FRANCISCO, CALIFORNIA.

LOCK-NUT.

1,377,397.  Specification of Letters Patent.  Patented May 10, 1921.

Application filed March 31, 1919. Serial No. 286,547.

*To all whom it may concern:*

Be it known that I, ROY L. CHANCE, a citizen of the United States, residing in the city and county of San Francisco and State of California, have invented a new and useful Improvement in Lock-Nuts, of which the following is a specification.

My invention relates to improvements in lock nuts, wherein an annular ratchet operates in conjunction with a pawl mounted within a washer; and the objects of my invention are—first, to provide an improved lock nut; second, to provide an improved lock nut which may be readily and easily released after having been locked upon a bolt or the like; and third, to provide an improved lock for nuts which may be accessible for releasing purposes.

I attain these objects by means of the mechanism illustrated in the accompanying drawings, in which:—

Figure 1 is a partly broken sectional view showing my improved lock nut in elevation; Fig. 2 is a bottom plan view of the washer; Fig. 3 is a bottom plan view of the nut; Fig. 4 is a top plan view of the locking washer; Fig. 5 is an enlarged broken elevation of the locking means; and Fig. 6 is an enlarged plan view of a portion of the washer.

Similar numerals refer to similar parts throughout the several views.

The nut 1 is screwed upon the threaded portion 2 of a bolt 3 and has an annular flange 4 provided on its under surface with an annular ratchet 5. A washer 6 is provided with a recess 7, which in one form of the invention, opens out onto the side of said washer 6 as disclosed in Figs. 4, 5 and 6 of the drawings. Or the recesses 7 may be positioned within the periphery of the washer 6 as disclosed in Fig. 1 of the drawings.

Within the recess 7 I have pivotally mounted a pawl 8 upon a pin 9 and a suitable spring 10 is provided within said recess 7 to normally retain the pawl 8 in engaging relation with the annular ratchet 5 and thereby permit a movement of the nut 1 relatively to the washer 6 in one direction only.

The washer 6 is provided with a pin 11 adapted to engage an aperture 12 within a member 13, said member 13 being any permanent element in which the bolt may be secured.

In operation the nut 1 is screwed upon the threaded portion 2 of the bolt 3 after the washer 6 has been positioned upon said nut to engage the pin 11 with the aperture 12 in the member 13. The nut 1 is then screwed upon the bolt 3 until the ratchet 5 approaches the pawl 8.

As the nut 1 is further screwed upon the bolt the pawl 8 slides over the annular ratchet 5 thereby permitting movement in that direction and as the spring 10 normally holds said pawl 8 in engaging relation with said ratchet 5 it is evident that the nut 1 cannot be turned in a reverse direction.

When the form of the invention, comprising the open recess, is used, it is possible to insert an instrument to depress the spring 10 and thereby release the tension of same from the pawl 8. If the nut 1 is then slightly turned in a clockwise direction a sufficient amount the pawl 8 will be released from the ratchet 5 by its own weight and drop into the recess 7. The nut 1 can then be screwed until beyond the range of the pawl 8.

I claim:—

1. In a lock nut, the combination with the threaded end of a bolt of a nut screwed thereon having an annular ratchet formed on the lower surface thereof; a washer arranged on the bolt and below the nut and having an L-shaped recess therein, said recess opening from the side of said washer, said washer being adapted to engage an apertured member held by the bolt; and a pawl pivotally mounted within the recess and arranged to engage the ratchet on the nut to permit a movement of the said washer relatively to the nut, in one direction only.

2. In a lock nut, the combination with the threaded end of a bolt of a nut screwed thereon and having an annular ratchet formed on the lower surface thereof; a washer arranged on the bolt and below the nut and having an L-shaped recess therein, said recess opening from the side of said washer, said washer being adapted to engage an apertured member held by the bolt; a pawl pivotally mounted within the recess and arranged to engage the ratchet on the nut to permit movement of the said washer relatively to the nut, in one direction only; and means for normally retaining an engaging relation between the pawl and the ratchet.

In witness whereof I hereunto set my signature.

ROY L. CHANCE.